J. F. CONNER.
CAR DOOR.
APPLICATION FILED APR. 20, 1912.
1,030,719.
Patented June 25, 1912.
2 SHEETS—SHEET 2.
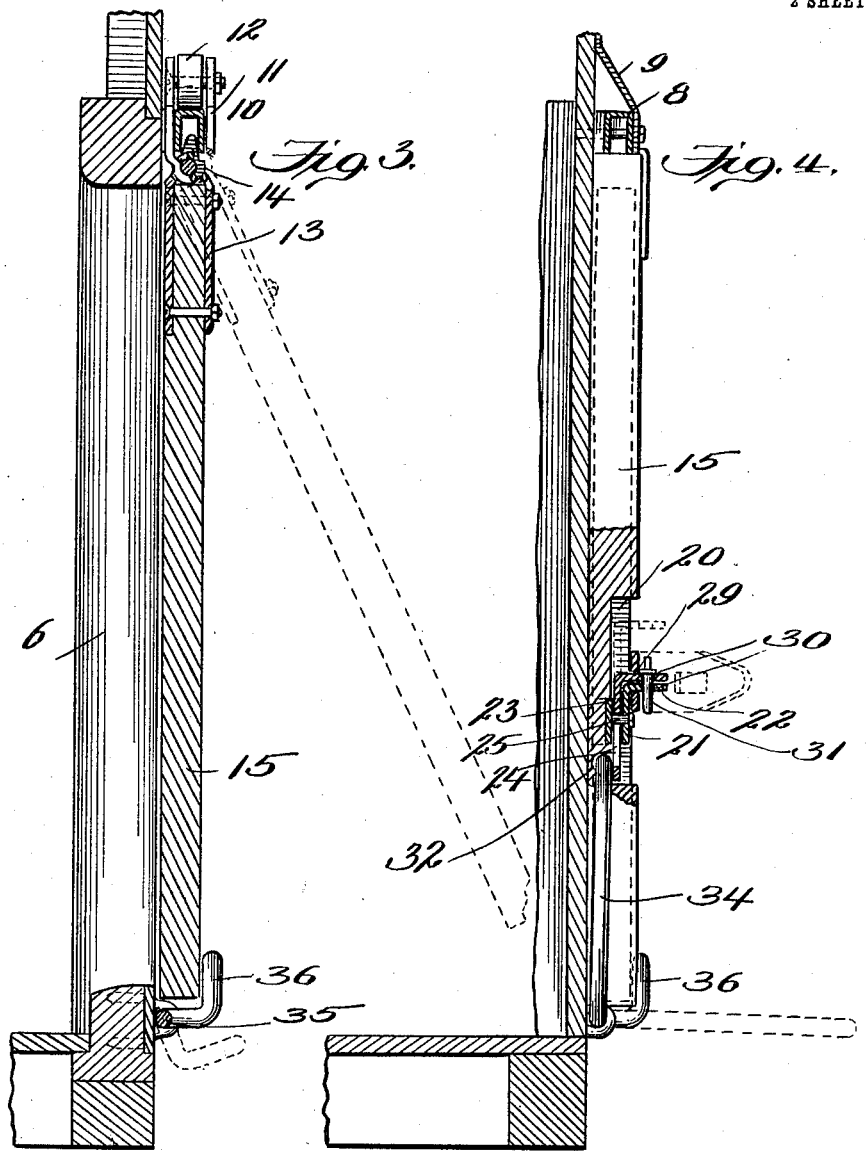
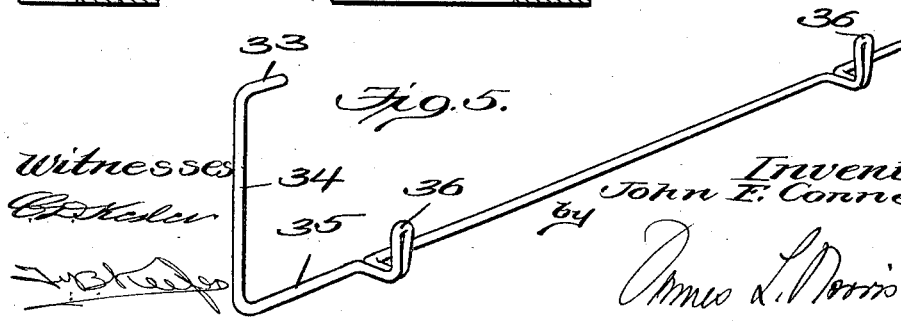
Witnesses
Inventor
John F. Conner

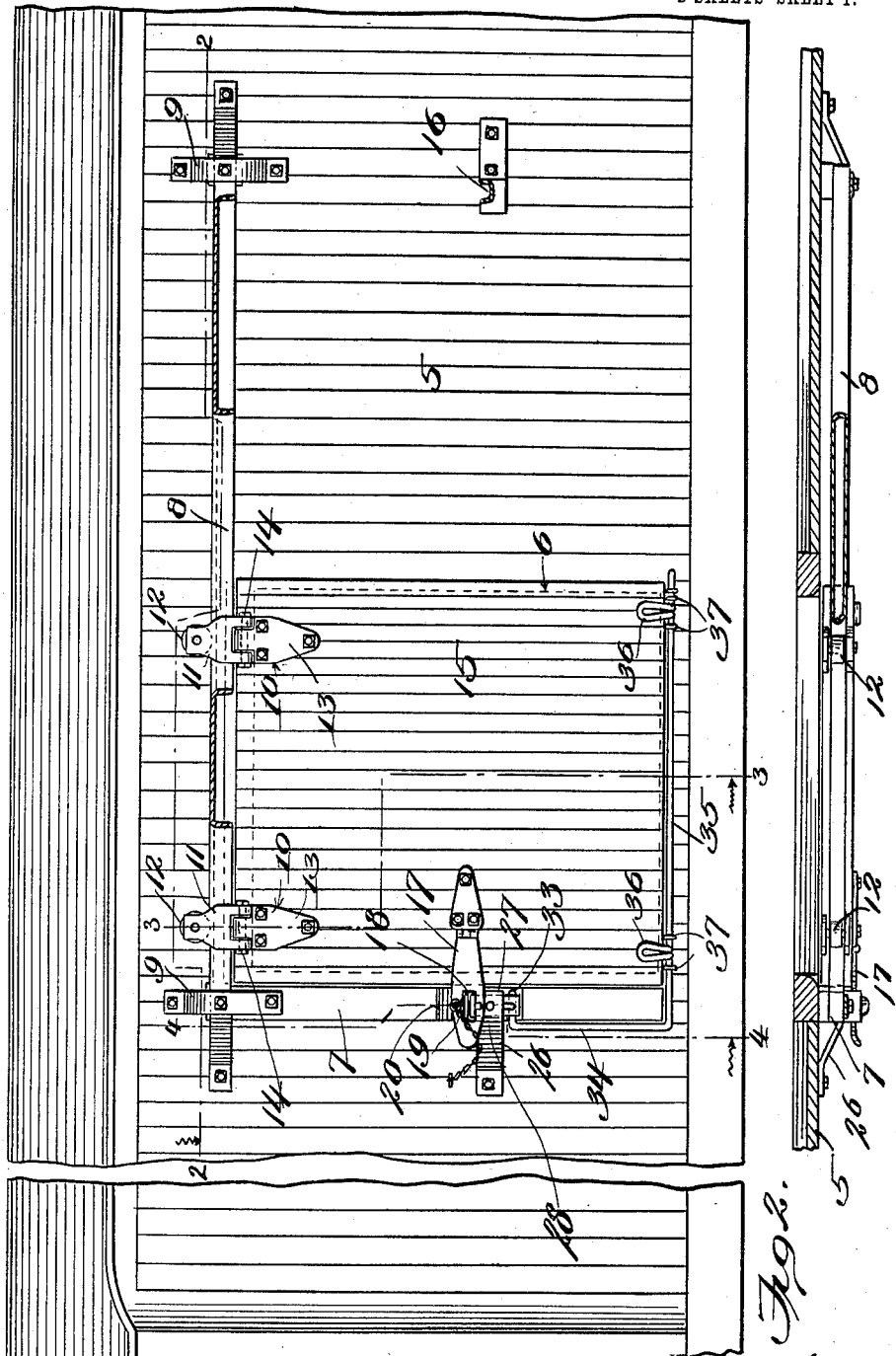

UNITED STATES PATENT OFFICE.

JOHN F. CONNER, OF OXFORD, MISSISSIPPI.

CAR-DOOR.

1,030,719.      Specification of Letters Patent.      Patented June 25, 1912.

Application filed April 20, 1912. Serial No. 691,999.

*To all whom it may concern:*

Be it known that I, JOHN F. CONNER, a citizen of the United States, residing at Oxford, in the county of Lafayette and State of Mississippi, have invented new and useful Improvements in Car-Doors, of which the following is a specification.

This invention relates to car doors and particularly that type used on freight cars, and the object of the same is to provide a car door that may be readily opened or closed and comparatively light and of a strong and durable nature. Frequently freight car doors become tight or rough and will not slide easily and may be moved only by the exertion of considerable power thereon, and, furthermore, freight car doors often become jammed by pressure of the contents of the car thereagainst and the hangers soon become sprung and the door deformed with the result that an impracticable closure is produced and which necessitates frequent repair or readjustment. The improved car door embodying the features of the invention has been devised to overcome these disadvantages by a comparatively simple organization of elements having an effective operation in contributing to the maintenance of the door in a practical working condition at all times.

The invention consists in the construction and arrangement of the several parts which will be more fully hereinafter described and claimed.

In the drawings: Figure 1 is a side elevation of a portion of a car showing the improved door applied thereto and illustrated in closed position. Fig. 2 is a horizontal section taken in the plane of the line 2—2, Fig. 1. Fig. 3 is a transverse vertical section taken in the plane of the line 3—3, Fig. 1, and showing the door swung outwardly in dotted lines. Fig. 4 is a transverse vertical section on the line 4—4, Fig. 1, showing parts in open position in dotted lines. Fig. 5 is a detail perspective view of the lower rail or controlling lever for the door.

The numeral 5 designates an ordinary form of freight car provided with a door opening 6, as shown by Fig. 3, having a stop strip or bar 7 adjacent to one side edge thereof. Extending longitudinally over the outer side of the car body above the plane of the door opening 6 is a top rail 8 which may be of any suitable form and length and held in place by securing devices 9 engaging the same. Movably associated with the upper rail 8 are hangers 10 comprising upper housings 11 with rollers 12 therein bearing on the upper edge of the rail 8, and lower leaves 13 movably connected to the lower extremities of the housings 11 by hinge joints, as at 14, and also firmly secured to the upper portion of the car door 15 which may be of any preferred construction. The car door 15 is suspended by the hangers 10 from the rail 8 and is adapted to engage a stop 16 secured to the car side when fully open. The strip or bar 7 limits the movement of the door 15 when it is closed or shifted over the door opening 6, and to lock the same when closed a hasp 17 is secured thereto and provided with a slot 18 adapted to move over a keeper 19 disposed in a recess 20 of the strip or bar 7. The keeper 19 is composed of a fixed member 21 having an outwardly projecting angular extremity 22 and a vertically sliding member 23 having a slot 24 therein through which extends a pin 25 for holding both members in applied position and having its outer headed extremity against a metal clip 26 having one end extending over the member 21 and the other end secured to an adjacent portion of the car side, as shown by Fig. 1. The vertically slidable member 23 is engaged by a metallic loop 27 having an angular side flange 28 engaging the outer side edge of the bar or strip 7 to hold the said member 23 against lateral locking movement. The upper extremity 29 of the member 23 is extended outwardly at an angle similarly to the adjacent extremity 22 of the member 21 and is disposed over said extremity 22, the extremities 22 and 29 having openings 30 therein adapted to aline for removably receiving a pin 31 that may be suitably sealed when the car door is locked.

In the lower portion of the recess 20 a rearwardly projecting seat 32 is formed to receive the upper inclined angular end or locking extremity 33 of an arm 34 extending at a right angle from a lower rail 35 having guards 36 formed at intervals therein. The rail 35 as a whole operates as a guard rail and is rotatably held on the car side below the door opening 6 by staples or other suitable bearing devices 37. The rail 35 with its guards 36 operates to hold the lower end of the door 15 inwardly in close association with the car side and over the door opening, and under normal conditions or when there is no inward pressure exerted against the door 15, the release of the hasp 17 from the keeper 19 will render the door free to have a sliding movement toward the stop 16 to uncover the opening 6, the rail 35 being of such length and the stop 16 having such predetermined position that the lower end of the door 15 will not become wholly disengaged from the said rail as long as the arm 34 is held closed against the car side. If the contents of the car exert a pressure against the door 15 and set up a binding action between the latter and the guards 36 strong enough to resist ready sliding movement of the door to open position after the hasp 17 is released, the vertically movable member 23 of the keeper will then be raised far enough to clear the recess 32 wherein the angular end 33 of the arm 34 is normally held and retained by the lower extremity of the said keeper 23. When this release has been effected, the arm 34 together with the angular end 33 is turned outwardly and the guards 36 moved away from engagement with the lower end of the door 15, as shown by dotted lines in Fig. 4. When the guards 36 have been cleared from the lower end of the door 15 the latter may be swung outwardly, as shown by dotted lines in Fig. 3, through the medium of the hinged hangers 10 and then readily moved toward the stop 16 to clear the door opening 6. When the arm 34 and angular end 33 are closed in, as shown by Fig. 1, and locked by the lower extremity of the member 23, the two angular extremities 22 and 29 will be in close relation and the hasp 17 may then be readily turned thereover and secured by inserting the pin 31 through the openings 30.

By the construction and arrangement of parts just described the car door may be readily opened, no matter what its condition may be due to wear and tear or rough character, and the door is of the same lightness as ordinary car doors, or in other words it is unnecessary to reinforce the door or add to the weight thereof. The improved organization of parts will be found exceptionally advantageous and it will be understood that changes in the proportions, dimensions and minor details may be adopted at will.

What is claimed is:

1. The combination with a car, of a rail, hinge hangers slidably engaging the rail, a door having portions of the hangers secured to the upper end thereof and also provided with a locking hasp, a two-part keeper comprising a movable member adapted to be engaged by the hasp, and a lower movable rail having guards to engage the lower end of the door and an arm with an angular end which is held closed by the movable member of the keeper.

2. The combination with a car, of a door movably suspended at its upper end and having a swinging operation inwardly and outwardly, a hasp secured to the door, a keeper on a part of the car, and a lower movable rail having means to engage the lower end of the door and normally locked closed by a part of the keeper.

3. The combination with a car, of an upper rail thereon, hangers slidably engaging the said rail and having depending hinge portions, a door having its upper end secured to said hinge portions of the hangers, a locking means for the door, a lower rail movably applied to the car and having means to engage the lower end of the door and also provided with an angular portion for engagement with the said locking means, and means for holding the locking means against opening movement.

4. The combination with a car door, of a top rail, a door having hinged sliding devices engaging the said rail, a lower rail movably applied to the car and having means to engage the lower end of the door, and locking means for the door, a portion of the lower rail being normally engaged by a part of the locking means to hold the said rail closed.

5. The combination with a car, of a top rail, a door having hinged devices secured to its upper end and movable on the said rail, a lower rail movably attached to the car and having means to engage the lower end of the door, and locking means for the door having a movable member to engage a portion of the lower rail and hold the latter normally closed.

In testimony whereof I have hereunto set my hand in presence of two subscribing witnesses.

JOHN F. CONNER.

Witnesses:
 G. B. TAYLOR,
 R. S. ADAMS.

Copies of this patent may be obtained for five cents each, by addressing the "Commissioner of Patents. Washington, D. C."